Figure 1:
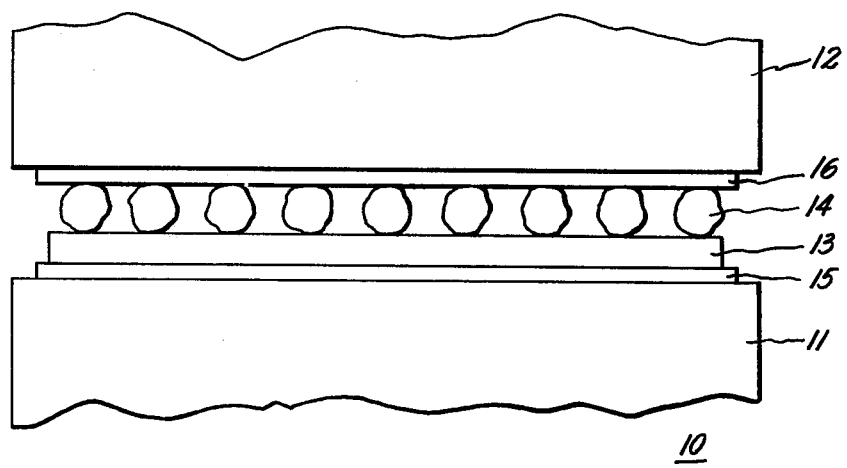

United States Patent [19]

Glugla et al.

[11] 4,247,499
[45] Jan. 27, 1981

[54] METHODS OF FORMING A SOLID ION-CONDUCTIVE ELECTROLYTE

[75] Inventors: Paul G. Glugla; Jacqueline L. Briant, both of Schenectady; Robert R. Gallucci, Scotia, all of N.Y.

[73] Assignee: General Electric Company, Schenectady, N.Y.

[21] Appl. No.: 40,298

[22] Filed: May 18, 1979

Related U.S. Application Data

[63] Continuation-in-part of Ser. No. 968,456, Dec. 11, 1978, abandoned.

[51] Int. Cl.³ .......................... B29C 23/00; B29D 3/00
[52] U.S. Cl. ...................................... 264/104; 29/423; 264/131; 264/272; 264/294; 264/320; 429/193
[58] Field of Search .............. 264/104, 131, 322, 271, 264/272, 510, 553, 49, 293, 320, 294; 428/143, 206; 29/423; 429/30, 191, 192, 193

[56] References Cited

U.S. PATENT DOCUMENTS

| | | | |
|---|---|---|---|
| 3,310,619 | 3/1967 | Slosberg | 264/293 |
| 3,502,493 | 3/1970 | Forestek | 428/206 |
| 3,522,339 | 7/1970 | Te Velde | 264/104 |
| 3,615,841 | 10/1971 | Smith | 264/104 |
| 3,796,782 | 3/1974 | Te Velde | 264/104 |
| 3,976,505 | 8/1976 | Farrington et al. | 429/192 |
| 4,105,833 | 8/1978 | Greatbatch et al. | 429/191 |

OTHER PUBLICATIONS

Anon, "Nem Materials Boast Battery Research", C&EN, Oct. 2, 1978, p. 14ff, relied on.
Te Velde et al, "Monogain Layers," Philips Tech. Review, Vol. 29 (1968), #29, pp. 238-242, relied On.

*Primary Examiner*—James H. Derrington
*Attorney, Agent, or Firm*—Paul R. Webb, II; James C. Davis, Jr.

[57] ABSTRACT

Methods of forming a solid ion-conductive electrolyte are described which comprise providing a preformed thermoplastic polymer film, positioning a plurality of solid ion-conductive particles against one surface of the polymer film, positioning a deformable sheet against one surface of the film, positioning a deformable sheet against the particles and the opposite surface of the film, hot pressing the particles into the film and deforming the deformable sheets, cooling the film, and removing the deformed sheets, thereby forming a polymer film having ion-conductive particles exposed on opposite surfaces of the film.

9 Claims, 2 Drawing Figures

METHODS OF FORMING A SOLID ION-CONDUCTIVE ELECTROLYTE

This application is a continuation-in-part application of copending patent application Ser. No. 968,456 filed Dec. 11, 1978, now abandoned and entitled "Method of Forming a Solid Ion-Conductive Electrolyte". The copending patent application is assigned to the same assignee as the present application.

The present invention relates to methods of forming a solid ion-conductive electrolyte, and more particularly, to such methods of forming an electrolyte which is a thin, flexible, heterogeneous film of solid ion-conductive electrolytes.

Such electrolytes are useful in electrochemical applications such as in a sealed lithium-bromine cell. Such a cell is described and claimed in U.S. Pat. No. 3,976,505 Farrington, et al issued Aug. 24, 1976, under the title "Sealed Lithium-Bromine Cell". This cell employs a lithium type cathode, a solid lithium sodium aluminate electrolyte, and a cathode of bromine in a non-aqueous solvent. Such electrolytes are useful in solid-state cells. This patent is assigned to the same assignee as the present application.

The term solid ion-conductive electrolyte as used in the present application includes monocrystalline and polycrystalline beta-alumina, beta"-alumina and mixtures thereof. Suitable beta-aluminas and beta"-aluminas include sodium beta-alumina, lithium beta-alumina, potassium beta-alumina, hydronium beta-alumina, lithium-sodium beta-alumina, lithiumsodium beta"-alumina, sodium beta"-alumina, lithium beta"-alumina, potassium beta"-alumina, and hydronium beta"-alumina.

Monograin polymer films and a method of preparing such films are set forth in an article entitled "Monograin Layers" by T. S. te Velde and G. W. M. T. van Helden on pages 238–242 in "Philips Technical Review", 29, 238, 1968. The subject article describes on page 239 a monograin technique which employs monocrystalline grains of electronically conductive material insulated from each other by being embedded in a maximum monograin thick thermosetting resin sheet. The grains must protrude from one or both sides of the sheet. As it is discussed on page 238 of the subject article, prior to the monograin technique, the principal techniques used for manufacturing solid-state devices are the planar technique and the thin film or vacuum-evaporation technique. Such techniques employ single crystalline or monocrystalline material which is required for best operation in solid-state devices. The monograin technique of this article employs monocrystalline grains in a monograin thick plastic sheet thereby providing an improved technique over these former techniques.

Copending patent application Ser. No. 961,259, filed Nov. 16, 1978, and entitled "Solid Ion-Conductive Electrolyte" describes and claims a solid ion-conductive electrolyte which comprises a polymer film, a plurality of solid polycrystalline ion-conductive particles embedded therein, and the particles exposed at both opposite surfaces of the film. This application is assigned to the same assignee as the present application.

Our present invention is directed to improved methods of forming a solid ion-conductive electrolyte.

The primary object of our invention is to provide improved methods of forming a thin, flexible, heterogeneous film of solid ion-conductive electrolytes.

In accordance with one aspect of our invention, a method of forming a solid ion-conductive electrolyte includes providing a preformed thermoplastic polymer film, positioning a plurality of solid ion-conductive particles against one surface of the polymer film, positioning a deformable sheet against one surface of the film, positioning a deformable sheet against the particle and the opposite surface of the film, hot pressing the particles into the film and deforming the deformable sheets, cooling the film, and removing the deformed sheets thereby forming a polymer film having ion-conductive particles exposed on opposite surfaces of the film.

Figure 2:
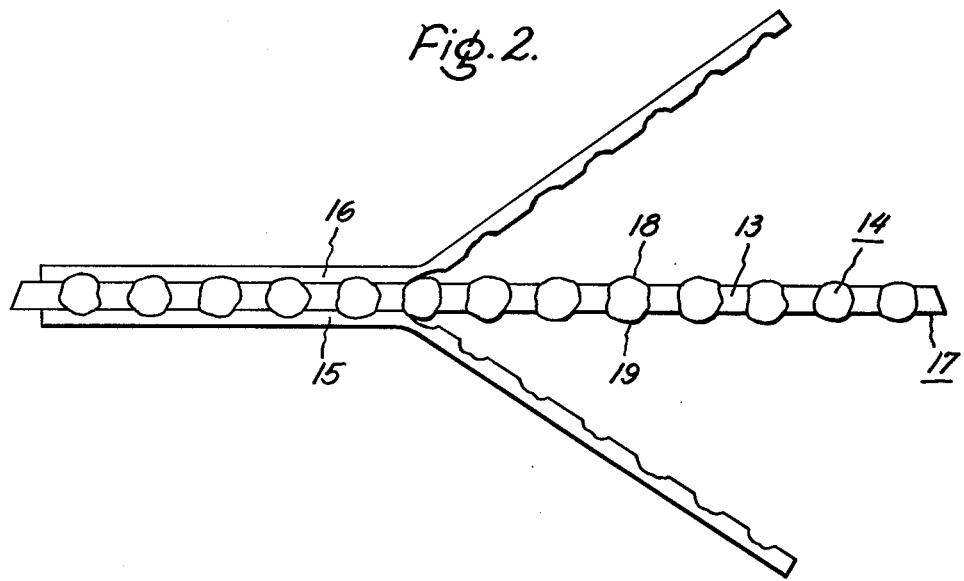

These and various other objects, features and advantages of the invention will be better understood from the following description, taken in connection with the accompanying drawing, in which:

FIG. 1 is a schematic view of apparatus and components to form a solid ion-conductive electrolyte made in accordance with one method of our invention, and FIG. 2 is a schematic view of our electrolyte removed partially from the deformed sheet.

In FIG. 1 of the drawing, there is shown generally at 10 apparatus and components to form a solid ion-conductive electrolyte embodying one method of our invention. A pair of opposed hot pressure plates 11 and 12 are provided for hot pressing. The associated pressure and heating mechanisms, which are conventional, are not shown for plates 11 and 12. A preformed thermoplastic polymer of film 13 of polypropylene is shown positioned with a plurality of solid polycrystalline ion-conductive particles 14 of sodium beta/beta"-alumina. A deformable sheet 15 of aluminum foil is positioned beneath film 13 while a deformable sheet 16 of aluminum foil is positioned above particles 14 and the upper surface of film 13.

The above method of forming a solid ion-conductive electrolyte comprises providing a thermoplastic polymer film, positioning a plurality of solid ion-conductive particles on the upper surface of the polymer film, positioning a deformable sheet beneath the film, positioning a deformable sheet above the particles and the upper surface of the film, hot pressing the particles into the film, and removing the deformed sheets, thereby forming a polymer film having ion-conductive particles exposed on opposite surfaces of the film.

Particles 14 are hot pressed by plates 11 and 12 into film 13 thereby exposing the particles at both opposite surfaces of film 13 and deforming sheets 15 and 16. The assembly of film 13 with particles 14 therein are removed from between plates 11 and 12 and allowed to cool to room temperature.

In FIG. 2 of the drawing, our electrolyte 17 is shown removed partially from deformed sheets 15 and 16 after the film is cooled in our method, sheets 15 and 16 are removed easily by hand. The resulting solid ion-conductive electrolyte made in accordance with one method of our invention has a preformed thermoplastic polymer film 13, a plurality of solid ion-conductive particles 14 embedded in film 13, and particles 14 exposed at both opposite surfaces 18 and 19 of film 13.

Various solid monocrystalline and polycrystalline ion-conductive particles are suitable in our methods. While we use the term particles in this application, such solid ion-conductive matter can be in the form of grains or spheres which are included within the definition of our term particles. We prefer beta-aluminas, beta"-aluminas and mixtures thereof. Many films with sodium beta/beta"-alumina in preformed polypropylene or in preformed polyethylene have been prepared using our new methods. This solid ion-conductor was chosen because it is a fairly typical ionic conductor. In our methods, a wide variety of preformed thermoplastic polymers can be employed. Particularly suitable preformed polymers are polypropylene and polyethylene. Such polymers are of interest in alkali metal battery systems in that they are inert to virtually every solvent in such battery systems and in that they are heat sealable. Various thicknesses of the thermoplastic polymer film can be employed. However, the particles must have a diameter greater than the thickness of the film so that the particles will subsequently be exposed at both opposite surfaces of the film. Various materials may be employed for the deformable sheets. Such materials include soft metal foil, a higher melting point polymer than the film, or rubber. A particularly attractive soft metal foil is aluminum foil or aluminum foil with a mold release, such as polytetrafluoroethylene. The particles are pressed into an existing or preformed thermoplastic polymer film between two sheets of deformable material at a temperature sufficient to soften the polymer so that the particles may be embedded therein and exposed at opposite surfaces thereof. Additionally, during our methods, the deformable sheets are deformed by the particles exposed at both opposite surfaces of the film. The exposed surfaces of the particles are not covered with the film during the process since they are embedded in the deformable material while the polymer is soft. The time period for pressing the particles into the film and exposing them at both opposite surfaces of the film can be extremely short, for example, 60 to 90 seconds. However, such time period is varied in accordance with the specific polymer employed and the specific deformable sheets employed. Similarly, the temperature employed in our process can vary over a range of temperature, but such temperature is easily chosen by selecting the temperature at which the specific polymer becomes soft.

We found that when we used sodium beta/beta"-alumina particles, optimum electrolytes were prepared when 120 micron particles of sodium beta/beta"-alumina were used in 90 micron thick polyethylene films. 15 micron aluminum foil was used with these films. The particles were pressed into an existing or preformed polyethylene thermoplastic polymer film between two sheets of aluminum foil at approximately 190° C. for 60 to 90 seconds. The assembly of the preformed thermoplastic polymer film with particles embedded therein and the sheet material which was deformed during the process was removed from between the hot pressure plates and cooled. Subsequently, the foils were peeled away from the polymer film with the particles embedded therein to provide a solid ion-conductive electrolyte made in accordance with our invention.

We found that we have improved methods of forming an electrolyte with monocrystalline or polycrystalline ion-conductive particles over the method of forming monocrystalline devices described in the subject article. We found further, that we have improved methods of forming a solid ion-conductive electrolyte over the process described in the above-identified copending patent application Ser. No. 961,259 in that our present methods include a simple, fast hot pressing process which employs either monocrystalline or polycrystalline ion-conductive particles.

An alternate method of forming a solid ion-conductive electrolyte in accordance with our invention includes positioning a plurality of ion-conductive particles on a deformable sheet and positioning a preformed thermoplastic polymer film on the particles. The particles are between one surface of the polymer film and one surface of the deformable sheet. A second deformable sheet is positioned against the other surface of the polymer film. The ion-conductive particle containing film is formed by hot pressing the particles into the polymer film, deforming the deformable sheets, cooling the film and removing the deformed sheet.

Examples of methods of forming solid ion-conductive electrolytes in accordance with our invention are set forth in the following examples:

EXAMPLE I

A solid ion-conductive electrolyte was formed by providing a preformed 90 micron thick high density polyethylene polymer film. A plurality of 120 micron solid polycrystalline ion-conductive particles of sodium beta/beta"-alumina were positioned on the upper surface of the preformed polyethylene film. A 15 micron thick deformable sheet of aluminum foil was positioned beneath the film. A 15 micron thick deformable sheet of aluminum foil was positioned above the particles and the upper surface of the film. The assembly of the preformed polymer film, particles and sheets were positioned between the opposing hot pressure plates of a press. The assembly was hot pressed at a temperature of 190° C. for 60 seconds. During the hot pressing, the particles were pressed into the film thereby exposing the particles at both opposite surfaces of the film. The assembly was removed from the press and cooled to room temperature. After cooling, the foils were peeled away resulting in a solid ion-conductive electrolyte comprising a polymer film, a plurality of polycrystalline ion-conductive particles pressed therein, and the particles exposed at both opposite surfaces of the film. This electrolyte was made in accordance with our invention.

EXAMPLE II

A solid ion-conductive electrolyte was formed by providing a preformed 90 micron thick polypropylene polymer film. A plurality of 120 micron solid polycrystalline ion-conductive particles of sodium beta/beta"-alumina were positioned on the upper surface of the preformed polypropylene film. A 15 micron thick deformable sheet of aluminum foil was positioned beneath the film. A 15 micron thick deformable sheet of aluminum foil was positioned above the particles and the upper surface of the film. The assembly of the preformed polymer film, particles and sheets were positioned between the opposing hot pressure plates of a press. The assembly was hot pressed at a temperature of 190° C. for 60 seconds. During the hot pressing, the particles were pressed into the film thereby exposing the particles at both opposite surfaces of the film. The assembly was removed from the press and cooled to room temperature. After cooling, the foils were peeled away resulting in a solid ion-conductive electrolyte comprising a polymer film, a plurality of polycrystalline ion-conductive particles pressed therein, and the particles exposed at both opposite surfaces of the film. This electrolyte was made in accordance with our invention.

EXAMPLE III

A solid ion-conductive electrolyte was formed by providing a preformed 90 micron thick film of a copolymer of ethylene and vinyl acetate. A pluraltiy of 120 micron solid polycrystalline ion-conductive particles of sodium beta/beta''-alumina were positioned on the upper surface of the preformed copolymer film. A 15 micron thick deformable sheet of aluminum foil with a mold release of polytetrafluoroethylene was positioned beneath the film. A 15 micron thick deformable sheet of aluminum foil with a mold release of polytetrafluoroethylene was positioned above the particles and the upper surface of the film. The assembly of the preformed polymer film, particles and sheets were positioned between the opposing hot pressure plates of a press. The assembly was hot pressed at a temperature of 155° C. for 60 seconds. During the hot pressing, the particles were pressed into the film thereby exposing the particles at both opposite surfaces of the film. The assembly was removed from the press and cooled to room temperature. After cooling, the foils were peeled away resulting in a solid ion-conductive electrolyte comprising a polymer film, a plurality of polycrystalline ion-conductive particles pressed therein, and the particles exposed at both opposite surfaces of the film. This electrolyte was made in accordance with our invention.

EXAMPLE IV

A solid ion-conductive electrolyte was formed by providing a preformed 90 micron thick high density polyethylene polymer film. A plurality of 120 micron solid monocrystalline ion-conductive particles of sodium beta-alumina were positioned on the upper surface of the preformed polyethylene film. A 15 micron thick deformable sheet of aluminum foil was positioned beneath the film. A 15 micron thick deformable sheet of aluminum was positioned above the particles and the upper surface of the film. The assembly of the preformed polymer film, particles and sheets were positioned between the opposing hot pressure plates of a press. The assembly was hot pressed at a temperature of 190° C. for 60 seconds. During the hot pressing, the particles were pressed into the film thereby exposing the particles at both opposite surfaces of the film. The assembly was removed from the press and cooled to room temperature. After cooling, the foils were peeled away resulting in a solid ion-conductive electrolyte comprising a polymer film, a plurality of monocrystalline ion-conductive particles pressed therein, and the particles exposed at both opposite surfaces of the film. This electrolyte was made in accordance with our invention.

EXAMPLE V

A solid ion-conductive electrolyte is formed by providing a preformed 90 micron thick high density polyethylene polymer film. A plurality of 120 micron solid polycrystalline ion-conductive particles of sodium beta/beta''-alumina are positioned on the upper surface of the preformed polyethylene film. A 15 micron thick deformable sheet of rubber is positioned beneath the film. A 15 micron thick deformable sheet of rubber is positioned above the particles and the upper surface of the film. The assembly of the preformed polymer film, particles and sheets is positioned between the opposing hot pressure plates of a press. The assembly is hot pressed at a temperature of 190° C. for 60 seconds. During the hot pressing, the particles are pressed into the film thereby exposing the particles at both opposite surfaces of the film. The assembly is removed from the press and cooled to room temperature. After cooling, the rubber sheets are removed resulting in a solid ion-conductive electrolyte comprising a polymer film, a plurality of polycrystalline ion-conductive particles pressed therein, and the particles exposed at both opposite surfaces of the film. This electrolyte was made in accordance with our invention.

While other modifications of the invention and variations thereof which may be employed within the scope of the invention have not been described, the invention is intended to include such as may be embraced within the following claims:

What we claim as new and desire to secure by Letters Patent of the United States is:

1. A method of forming a solid ion-conductive electrolyte comprises providing a preformed thermoplastic polymer film, positioning a plurality of solid ion-conductive particles against one surface of the polymer film, positioning a deformable sheet against one surface of the film, positioning a deformable sheet against the particles and the opposite surface of the film, hot pressing the particles into the film and deforming the deformable sheets, cooling the film, and removing the deformed sheets, thereby forming a polymer film having ion-conductive particles exposed on opposite surfaces of the film.

2. A method of forming a solid ion-conductive electrolyte comprises providing a preformed thermoplastic polymer film, positioning a plurality of solid ion-conductive particles on the upper surface of the polymer film, positioning a deformable sheet beneath the film, positioning a deformable sheet above the particles and the upper surface of the film, hot pressing the particles into the film and deforming the deformable sheets, cooling the film, and removing the deformed sheets, thereby forming a polymer film having ion-conductive particles exposed on opposite surfaces of the film.

3. A method of forming a solid ion-conductive electrolyte as in claim 1, in which the solid ion-conductive particles are selected from the class consisting of beta-aluminas, beta''-aluminas, and mixtures thereof.

4. A method of forming a solid ion-conductive electrolyte as in claim 1, in which the thermoplastic polymer film is polypropylene.

5. A method of forming a solid ion-conductive electrolyte as in claim 1, in which the thermoplastic polymer film is polyethylene.

6. A method of forming a solid ion-conductive electrolyte as in claim 1, in which the deformable sheet is a soft metallic foil.

7. A method of forming a solid ion-conductive electrolyte as in claim 1, in which the deformable sheet is a higher melting point polymer than the thermoplastic polymer film.

8. A method of forming a solid ion-conductive electrolyte as in claim 1, in which the deformable sheet is rubber.

9. A method of forming a solid ion-conductive electrolyte comprises providing a preformed 90 micron thick polyethylene thermoplastic polymer film, positioning a plurality of 120 micron solid polycrystalline ion-conductive particles of sodium beta/beta''-alumina on the upper surface of the polymer film, positioning a 15 micron thick deformable sheet of aluminum foil beneath the film, positioning a 15 micron thick deformable sheet of aluminum foil above the particles and the upper surface of the film, hot pressing the particles into the film at a temperature of 190° C. for 60 seconds and deforming the deformable sheets, cooling the film, and removing the deformed sheets, thereby forming a polymer film having ion-conductive particles exposed on opposite surfaces of the film.

* * * * *